United States Patent [19]
Emery

[11] Patent Number: 5,560,971
[45] Date of Patent: Oct. 1, 1996

[54] MULTI-LAYER MATERIAL FOR SUPPRESSION OF CERAMIC SHRAPNEL CREATED DURING A BALLISTIC EVENT

[75] Inventor: Nathan B. Emery, Spartanburg, S.C.

[73] Assignee: Milliken Research Corporation, Spartanburg, S.C.

[21] Appl. No.: 424,751

[22] Filed: Apr. 18, 1995

[51] Int. Cl.⁶ .............................. B32B 33/00; F41H 5/04; F41H 7/02
[52] U.S. Cl. .................. 428/92; 89/36.02; 89/36.08; 428/96; 428/236; 428/238; 428/252; 428/253; 428/911
[58] Field of Search ................. 89/36.02, 36.08; 428/92, 96, 236, 238, 252, 253, 911

[56] References Cited

U.S. PATENT DOCUMENTS

| | | | |
|---|---|---|---|
| 3,575,786 | 4/1971 | Baker et al. | |
| 3,577,306 | 5/1971 | Baker et al. | |
| 3,745,938 | 7/1973 | Hathaway et al. | 109/49.5 |
| 3,924,038 | 12/1975 | McArdle et al. | 428/49 |
| 3,988,780 | 11/1976 | Armellino | 2/2.5 |
| 4,186,648 | 2/1980 | Clausen et al. | 89/36 A |
| 4,292,882 | 10/1981 | Clausen | 89/36 A |
| 4,522,871 | 6/1985 | Armellino, Jr. et al. | 428/252 |
| 4,574,105 | 3/1986 | Donovan | 428/233 |
| 4,664,967 | 5/1987 | Tasdemiroglu | 428/220 |
| 4,738,893 | 4/1988 | Grillo | 428/252 |
| 4,850,050 | 7/1989 | Droste et al. | 2/2.5 |
| 4,989,266 | 2/1991 | Borgese et al. | 2/2.5 |
| 5,044,252 | 9/1991 | Gamadi et al. | 86/50 |
| 5,180,880 | 1/1993 | Zufle | 89/36.02 |
| 5,190,802 | 3/1993 | Pilato | 428/111 |

FOREIGN PATENT DOCUMENTS

| | | |
|---|---|---|
| 2659727 | 7/1978 | Germany. |
| 61-255854 | 11/1986 | Japan. |
| 1534721 | 12/1978 | United Kingdom. |
| 2128547 | 5/1984 | United Kingdom. |
| 2283902 | 5/1995 | United Kingdom. |
| 2147977 | 5/1995 | United Kingdom. |

*Primary Examiner*—James C. Cannon
*Attorney, Agent, or Firm*—Kevin Kercher; Terry Moyer

[57] ABSTRACT

This invention provides a multi-layer material designed to cover ceramic armor applied to military vehicles, which suppresses ceramic shrapnel created during a ballistic event up to the magnitude of a 0.50 caliber at 2000–2200 feet per second at zero degree obliquity. This material is a laminate comprising of three distinct layers of fabric. The middle layer is a heavy ballistic nylon or polyester fabric. A nylon fabric of this nature weighs between fifteen to thirty-five ounces per square yard and a polyester fabric of this nature weighs between fifteen to thirty-five ounces per square yard. This fabric can be either woven or knitted. The outer layer that is attached to the middle layer can be any type of decorative fabric, including woven, nonwoven and knit fabrics. This fabric should be relatively light weight and dyeable. The bottom layer of fabric is a loop pile, warp knit, weft-inserted fabric. The length of each loop, yarn type, and denier is adapted to comport to a particular hook system utilized on a particular military vehicle. These three layers of fabric are adhesively attached to each other.

4 Claims, 6 Drawing Sheets

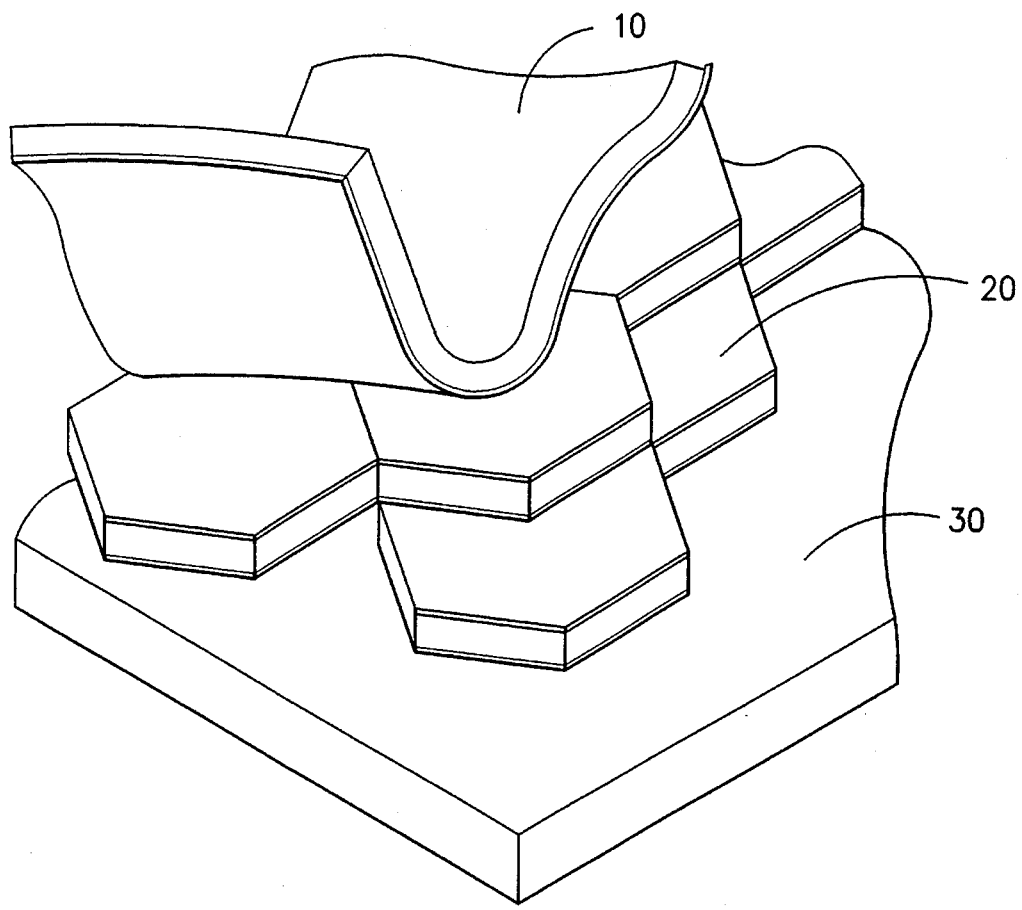
FIG. -1-
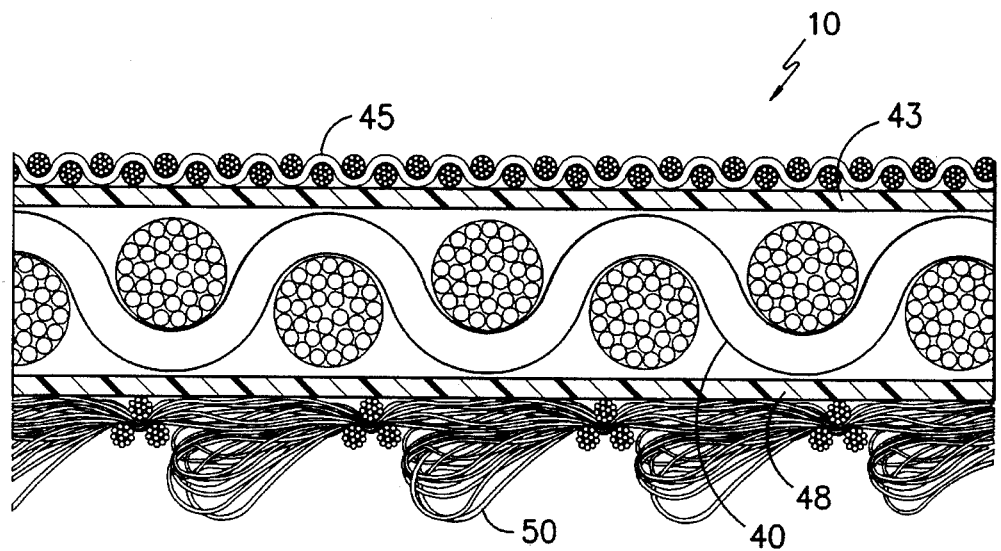
FIG. -2-

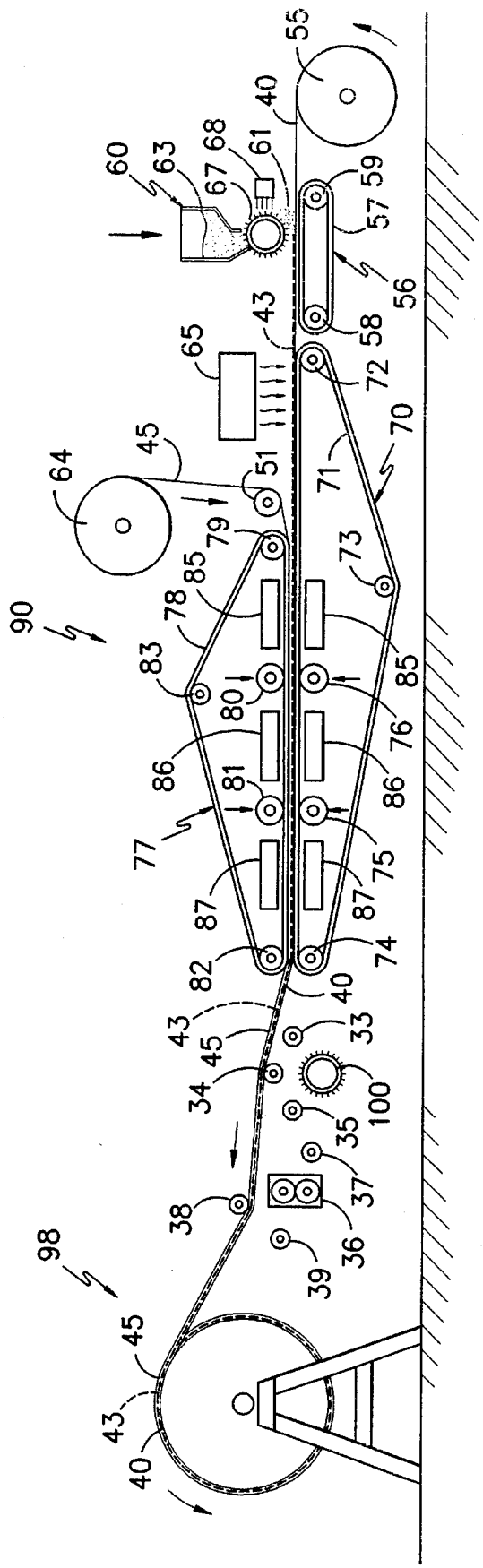
FIG. -3-

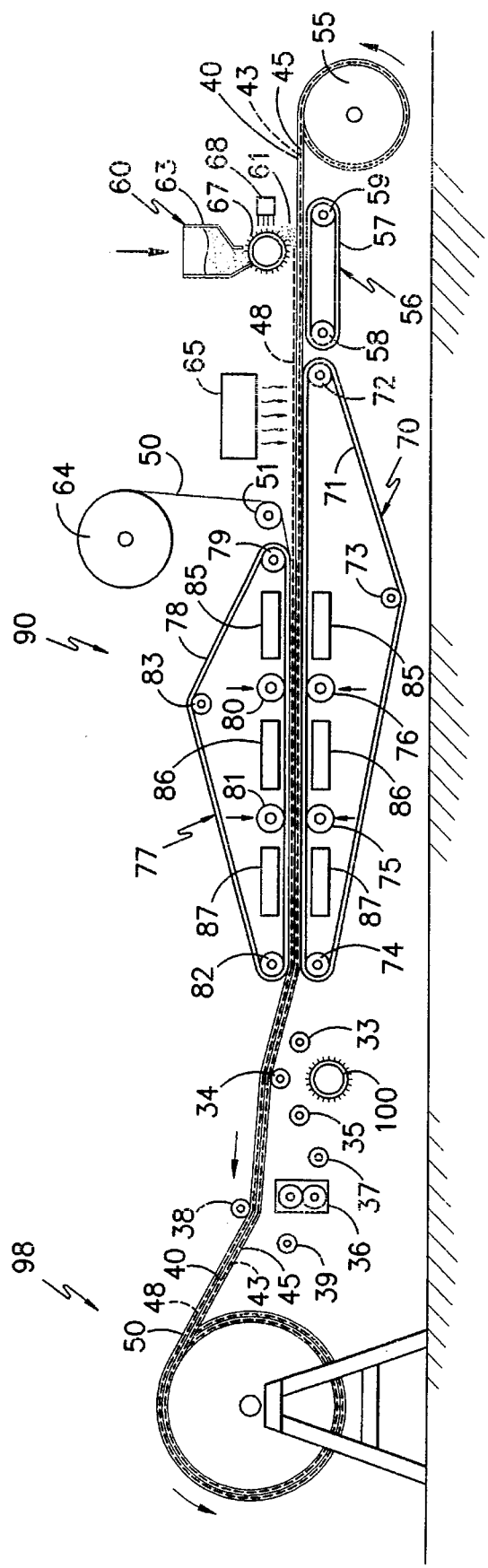
FIG. -4-

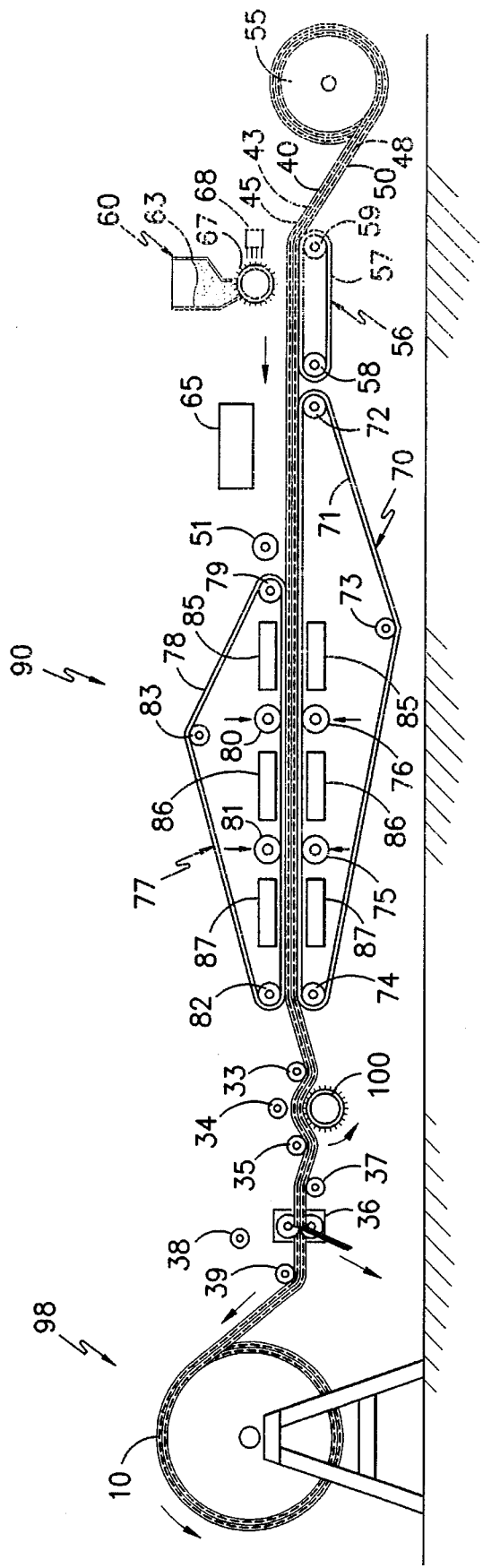
FIG. -5-

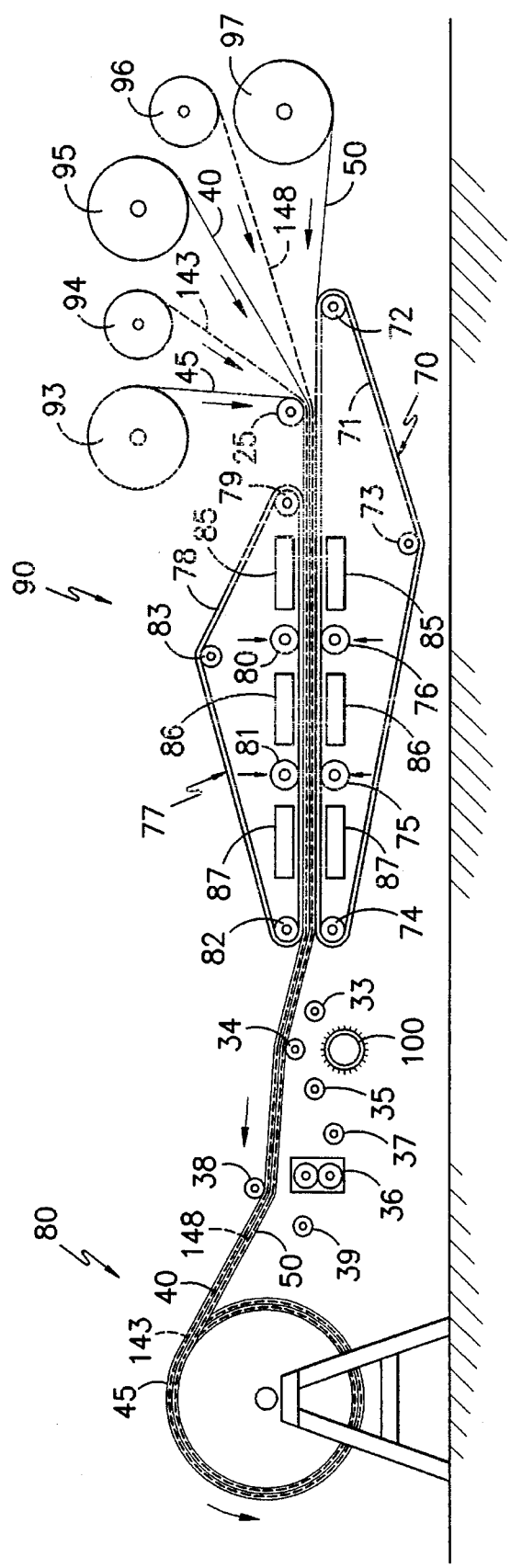
FIG. -6-

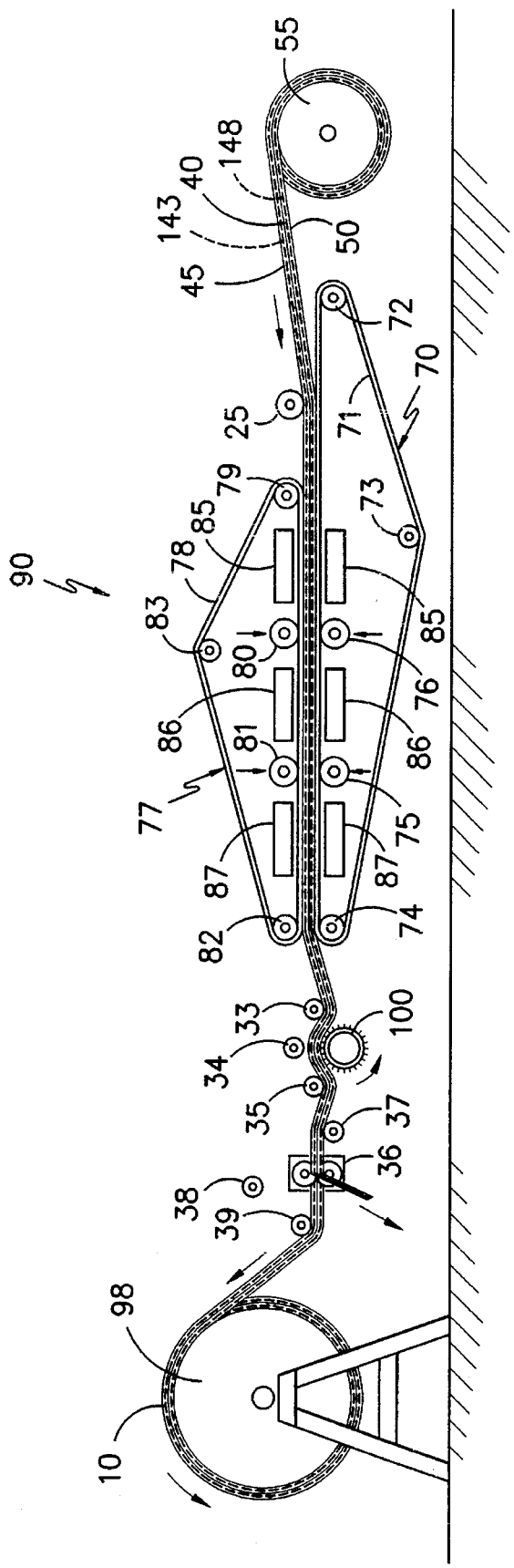
FIG. -7-

MULTI-LAYER MATERIAL FOR SUPPRESSION OF CERAMIC SHRAPNEL CREATED DURING A BALLISTIC EVENT

BACKGROUND OF THE INVENTION

This invention relates to an improved multi-layer material for suppression of ceramic shrapnel created during a ballistic event up to the magnitude of a 0.50 caliber at 2000–2200 feet per second at zero degree obliquity. Ceramic armor is utilized on a number of military vehicles. When the ceramic armor is struck by projectiles, it can shatter and strike military personnel positioned alongside the vehicle. The ballistic performance of fabrics currently utilized to suppress the shattering of ceramics is very poor. Furthermore, existing fabrics are not flexible and are very heavy. In addition, there are significant problems with light-fastness. Moreover, present fabrics typically do not match the patterns on a military vehicle.

The present invention solves these problems and others in a manner not disclosed in the known prior art.

SUMMARY OF THE INVENTION

This invention provides a multi-layer material designed to cover ceramic armor applied to military vehicles, which suppresses ceramic shrapnel created during a ballistic event up to the magnitude of a 0.50 caliber at 2000–2200 feet per second at zero degree obliquity. This material is a laminate comprising of three distinct layers of fabric. The middle layer is a heavy ballistic nylon or polyester fabric. A nylon fabric of this nature weighs between fifteen to thirty-five ounces per square yard and a polyester fabric of this nature weighs between fifteen to thirty-five ounces per square yard. This fabric can be either woven or knitted. The outer layer that is attached to the middle layer can be any type of decorative fabric, including woven, nonwoven and knit fabrics. This fabric should be relatively light weight and dyeable. The bottom layer of fabric is a loop pile, warp knit, weft-inserted fabric. The length of each loop, yarn type, and denier is adapted to comport to a particular hook system utilized on a particular military vehicle. These three layers of fabric are adhesively attached to each other.

It is an advantage of this invention to significantly improve ballistic performance to protect military personnel from ceramic shrapnel during a ballistic event.

Yet another advantage of this invention is the improved flexibility of this ceramic shrapnel suppressing multi-layer material.

Still another advantage of this invention is that this multi-layer material is relatively light weight.

Another advantage of this invention is that this multi-layer material is lightfast.

Yet another advantage of this invention is the availability of camouflage patterns to match patterns on military vehicles.

These and other advantages will be in part apparent, and in part pointed out below:

BRIEF DESCRIPTION OF THE DRAWINGS

The above, as well as other objects of the invention will become more apparent from the following detailed description of the preferred embodiment of the invention, which when taken together with the accompanying drawings in which:

FIG. 1 is an isolated perspective view of the multi-layer material of the present invention covering ceramic armor modules attached to a military vehicle hull;

FIG. 2 is a side elevational view of the multi-layer material of the present invention;

FIG. 3 is a schematicized side view of a preferred apparatus for generating multi-layer material of the present invention for attaching a top layer to a middle layer;

FIG. 4 is a schematicized side view of the preferred apparatus for generating multi-layer material of the present invention for attaching the combined top layer and middle layer, as shown in FIG. 3, to a bottom layer;

FIG. 5 is a schematicized side view of the preferred apparatus for generating multi-layer material of the present invention, as shown in FIG. 4, with edge trimming, loop brushing in conjunction with additional lamination of the combined multilayer material; p FIG. 6 is a schematic side view of an alternative apparatus for generating multi-layer material of the present invention; and FIG. 7 is a schematicized side view of the alternative apparatus for generating multi-layer material of the present invention, as shown in FIG. 6, with edge trimming, loop brushing in conjunction with additional lamination of the combined multi-layer material.

Corresponding reference characters indicate corresponding parts throughout the several view of the drawings.

DETAILED DESCRIPTION OF THE PREFERRED EMBODIMENT

Referring now to the accompanying drawings, and initially to FIG. 1, which discloses the multi-layer material of the present invention, generally indicated by numeral 10. FIG. 1 also discloses this multi-layer material 10 covering ceramic armor modules 20 attached to a military vehicle hull 30. A typical example of ceramic armor modules 20 is manufactured by LAST® Armor, Inc. located at 350 Second Avenue, Waltham, Mass. 02154.

Referring now to FIG. 2, the multi-layer material 10 has a middle layer as depicted by numeral 40. This middle layer 40 can be either nylon or polyester, however, nylon is preferred. This middle layer can be either woven or knitted fabric, however, woven fabric is preferred.

If nylon yarn is utilized, the number of plies should range from one to four. The denier of the yarn should range from 400 to 2,000. The ounces per square yard should range from 15 to 35. The ends per inch should range from 20 to 40 and the picks per inch should range from 20 to 40. The warp tensile should range from 600 to 3,000 and the fill tensile should range from 600 to 3,000.

If polyester yarn is utilized, the preferred number of plies should range from one to four. The denier of the yarn should range from 400 to 2,000. The ounces per square yard should range from 15 to 35. The ends per inch should range from 20 to 40 and the picks per inch should range from 20 to 40. The warp tensile should range from 600 to 3,000 and the fill tensile should range from 600 to 3,000.

The preferred nylon fabric for middle layer 40 has 28.5 ends per inch with a tolerance of plus or minus one end per inch and 30.5 picks per inch with a tolerance of plus or minus 0.5 picks per inch. The width of this preferred nylon fabric is 72 inches with a tolerance of plus or minus one inch. This preferred woven nylon fabric is 19.82 ounces per square yard with a tolerance of plus or minus 0.5 ounces per square yard. There is a minimum warp tensile of 1200 and a minimum fill tensile of 1200. The percent of warp crimp is 3 plus or minus one percent and the percent of fill crimp is 4 plus or minus one percent. The nylon yarn has three plies with two "S" twists per inch. These parameters are for nylon fabric in the greige state. The nylon fabric is then finished by heat-setting the fabric using a standard tenter frame with a temperature range of 300 to 450 degrees Fahrenheit. The preferred temperature is 375 degrees Fahrenheit. This heat-setting will shrink the nylon fabric to 22 ounces per square yard.

Superimposed on middle layer 40 is a top layer 45. There is a first adhesive layer 43 located between the middle layer 40 and the top layer 45 for attaching the top layer 45 to the middle layer 40. Top layer 45 can be of virtually any type of lightweight, dyeable fabric that can be a woven, nonwoven, or knitted. If the top layer 45 is either woven or knitted, the preferred number of plies should range from one to four. The denier of the yarn should range from 70 to 1,000. The ounces per square yard should range from 2 to 20. If the top layer 45 is woven, the ends per inch should range from 30 to 150 and the picks per inch should range from 20 to 70. The warp tensile should range from 10 to 1,000 and the fill tensile should range from 10 to 1,000.

The preferred fabric for top layer 45 is a 100% polyester, woven fabric. The 100% polyester fabric goes through six stages that include slashing, tie-in, weaving, inspecting, rolling and stretching on a tenter frame. The width when shipped is a standard width of 65.5" with a tolerance of plus or minus 0.8 inches. The standard weight is 7.21 ounces per square yard with a tolerance of plus or minus 0.22 ounces per square yard. The preferred number of ends per inch is 96 with a tolerance of plus or minus 1.9 ends per inch. The number of picks per inch has a standard value of 34 with a tolerance of plus or minus one pick per inch. The yarn in the warp preferably is a two ply, 150 denier, 34 filament yarn. The yarn in the fill is preferably a four ply, 150 denier, 34 filament yarn. This top layer 45 is then dyed either a solid color or patterned. The preferred pattern is camouflage. A means to apply dye in either solid color or patterned is by spraying a dye onto the surface of the fabric by dividing a stream of dye into droplets by an impinging stream of pressurized control fluid directed at the surface to be sprayed. This technology is disclosed in U.S. Pat. No. 5,211,339 that issued May 18, 1993, which is incorporated by reference as if fully set forth herein. This top layer 45 is then finished by heat-setting the fabric using a standard tenter frame with a temperature range of 300 to 450 degrees Fahrenheit. The preferred temperature is 360 degrees Fahrenheit. A solution of a urethane emulsion, flourochemical water repellant, fungicide, and water is padded onto the top layer 45. A typical nonlimiting example of a urethane emulsion is WITCOBOND® 290H manufactured by Witco Corporation located at One American Lane, Greenwich, Conn. 06831. The percentage of urethane emulsion in solution can range from five to twenty-five percent with the preferred percentage being twelve. A typical nonlimiting example of a flourochemical water repellant is MILLI-GARD® 309 manufactured by Milliken & Company located at 920 Milliken Road, Spartanburg, S.C. 28230. The percentage of flourochemical water repellant in solution can range from two to fifteen percent with the preferred percentage being six. A typical nonlimiting example of a fungicide is ULTRAFRESH® 40 manufactured by Thomson Research Associates located at 223 Adelaide Street West, Toronto, Ontario, Canada M5H1X4. The percentage of fungicide in solution can range from zero to five percent with the preferred percentage of 0.5. The remaining ingredient in the pad solution is water.

The combination of top layer 45 and middle layer 40 is superposed on a bottom layer 50. There is a second adhesive layer 48 located between the middle layer 40 and the bottom layer 50 for attaching the middle layer 40 to the bottom layer 50.

The bottom layer 50 is a loop pile, warp knit, weft-inserted fabric. This loop pile, warp knit, weft-inserted fabric provides loops for attaching to hooks located on the hull of a military vehicle for attaching multi-layer material 10 to the military vehicle hull 30. This bottom layer 50 is a two-bar, warp knit fabric having a face side and a back side with the face side having a plurality of spaced wales of chain stitches and the back side of the fabric having a plurality of spaced wales of tricot stitches with the lap portion of each of the tricot stitches projecting outwardly therefrom to form a free loop connected only by its base to a respective wale. There is weft yarn inserted into each course of the yarn between the face and the back side of the fabric in the weft direction and held substantially parallel to one another by chain stitches. A typical example of this loop pile, warp knit, weft-inserted fabric can be found in U.S. Pat. No. 4,624,116, issued on Nov. 25, 1986, which is incorporated by reference as if fully set forth herein.

The preferred embodiment of loop pile, warp knit, weft-inserted fabric includes the utilization of nylon for the loops, however, other fibers may be utilized. The denier of the nylon can range from 100 to 400 with the preferred denier being 260. The courses per inch ranges from 40 to 70, with the preferred number of courses per inch being 54 and the wales per inch ranges from 5 to 20, with the preferred number of wales per inch being 9. The weight in ounces per square yard can range between 4 to 15 with the preferred weight being 6 ounces per square yard.

In a warp knitting machine, it is preferred in bar one to utilize 1/260/20 nylon and bar two 1/150/34 polyester and in the weft 1/150/34 polyester. The calculated fiber content of the preferred loop pile, weft-inserted bottom layer 50 is 65% nylon and 35% polyester. This bottom layer 50 is then finished by heat-setting the fabric using a standard tenter frame with a temperature range of 300 to 450 degrees Fahrenheit. The preferred temperature is 360 degrees Fahrenheit. A solution of a fungicide, and water is padded onto the bottom layer 50. A typical nonlimiting example of a fungicide is ULTRAFRESH® 40 manufactured by Thomson Research Associates located at 223 Adelaide Street West, Toronto, Ontario, Canada M5H1X4. The percentage of fungicide in solution can range from zero to five percent with the preferred percentage of 0.5. The remaining ingredient in the pad solution is taken up by water.

The adhesives utilized in either the first adhesive layer 43 or second adhesive layer 48 can include a polyamide adhesive powder, a urethane film, a polyamide adhesive web, a polyester adhesive powder, a polyester adhesive web, hot melt polyester, hot melt polyamide, and hot melt urethane.

Referring now to FIG. 3, for the preferred apparatus for creating the multi-layer material 10 of the present invention includes a first let-off roll 55 having the middle layer 40 thereon. The middle layer 40 then travels on top of a first continuous belt conveyor 56 at a speed in the range of one to eleven yards per minute. The first continuous belt conveyor 56 includes a first continuous belt 57 that encircles a first roller 58 and a second roller 59. While traveling on top of first continuous belt conveyor 56, middle layer 40 passes under an adhesive powder applicator 60 that includes a powder bin 63, a variable speed gravure roll 67, and an oscillating brush 68 mounted on the variable speed gravure roll 67 for controlled application of adhesive powder 61. The preferred adhesive powder 61 is a polyamide with particle size of between 200 and 500 microns manufactured by EMS-American Grilon located at 2066 Corporate Way, Sumter, S.C. 29151. Adhesive powder 61 is applied in the range of one to six ounces per square yard. A nonlimiting example of an adhesive powder applicator 60 is manufactured by Herbert Meyer GmbH, located at 8 Munchen 83, Bayerwaldstra Be 29, Germany.

The middle layer 40 with adhesive powder 61 applied thereon is then transferred to a laminator that is generally indicated by numeral 90. Laminator 90 includes a lower belt, continuous conveyor that is generally indicated by numeral 70 and an upper belt, continuous conveyor 77 that are in an opposing relationship. Lower belt, continuous conveyor 70 includes a lower continuous belt 71 that encircles a first roller 72, second roller 73, third roller 74, fourth roller 75, and fifth roller 76. Upper belt, continuous conveyor 77 includes an upper continuous belt 78 that encircles a sixth roller 79, seventh roller 80, eighth roller 81, ninth roller 82, and tenth roller 83. Laminator 90 also includes a first dual, opposing, heating zone 85, second dual, opposing, heating zone 86, and a dual, opposing, cooling zone 87. The middle layer 40 with adhesive powder 61 applied thereon first travels on the top of lower continuous belt 71 and the first roller 72 for a distance of approximately seven feet prior to being sandwiched between both lower continuous belt 71 and upper continuous belt 78. An infrared heater 65 is located above this portion of the lower belt, continuous conveyor 70.

The middle layer 40 then passes under an infrared heater 65. Infrared heater 65 radiates heat in a temperature range of 200 to 1,600 degrees Fahrenheit. A nonlimiting example of an infrared heater 65 is also manufactured by Herbert Meyer GmbH, located at 8 Munchen 83, Bayerwaldstra Be 29, Germany. This melting of the adhesive 61 creates the previously described first adhesive layer 43.

There is a second let-off roll 64 having the previously described top layer 45 thereon that travels over a first guide roll 51 and underneath sixth roller 79. The top layer 45 then travels to in superposed relationship over the first adhesive layer 43 and into dual, opposing, lower belt, continuous conveyor 70 and upper belt, continuous conveyor 77 through a first dual, opposing, heating zone 85 that is at a temperature in the range of 250 to 450 degrees Fahrenheit. The combination of middle layer 40, first adhesive layer 43, and top layer 45 then passes between seventh roller 80 on top and fifth roller 76 below, which applies pressure in the range of zero to twenty-six pounds per square inch. The combination of middle layer 40, first adhesive layer 43, and top layer 45 then passes through a second dual, opposing, heating zone 86 that is at a temperature in the range of 250 to 450 degrees Fahrenheit. The combination of middle layer 40, first adhesive layer 43, and top layer 45 then passes between eighth roller 81 on top and fourth roller 75 below, which applies pressure in the range of zero to twenty-six pounds per square inch. The combination of middle layer 40, first adhesive layer 43, and top layer 45 then passes through a dual, opposing, cooling zone 87 that is at a temperature in the range of 60 to 300 degrees Fahrenheit. The combination of middle layer 40, first adhesive layer 43, and top layer 45 then passes out of the upper belt, continuous conveyor 77 and ninth roller 82 and lower belt, continuous conveyor 70 and third roller 74. Lower continuous belt 71 then loops back around second roller 73, which places lower continuous belt 71 under constant pressure. Lower continuous belt 71 loops back around first roller 72 to complete the loop. In a similar manner, upper continuous belt 78 then loops back around tenth roller 83, which places upper continuous belt 78 under constant pressure. Upper continuous belt 78 loops back around sixth roller 79 to complete the loop.

The combination of lower belt, continuous conveyor 70 and upper belt, continuous conveyor 77 move the combination of middle layer 40, first adhesive layer 43, and top layer 45 at a rate of one to eleven yards per minute.

The combination of lower belt, continuous conveyor 70, upper belt, continuous conveyor 77, first dual, opposing, heating zone 85, second dual, opposing, heating zone 86, and dual, opposing, heating zone 87 form a laminator as is generally indicated by numeral 90. A nonlimiting example of a laminator 90 is a Meyer® Laminator RPS-K 2200, manufactured by Herbert Meyer GmbH, located at 8 Munchen 83, Bayerwaldstra Be 29, Germany.

The combination of middle layer 40, first adhesive layer 43, and top layer 45 then passes over a second roller brush guide roll 34 and under a second slitter guide roll 38 and is then rolled onto take-up roll 98.

Referring now to FIG. 4, which is the identical operation to that disclosed in FIG. 3, however, the first let-off roll 55 has the combination of the middle layer 40, first adhesive layer 43, and top layer 45 thereon, in that order from top to bottom.

The combination of the middle layer 40, first adhesive layer 43, and top layer 45 then travels on top of a first continuous belt conveyor 56 at a speed in the range of one to eleven yards per minute. The first continuous belt conveyor 56 includes a first continuous belt 57 that encircles a first roller 58 and a second roller 59. While traveling on top of first continuous belt conveyor 56, the combination of the middle layer 40, first adhesive layer 43, and top layer 45 passes under an adhesive powder applicator 60 that includes a powder bin 63, a variable speed gravure roll 67, and an oscillating brush 68 mounted on the variable speed gravure roll 67 for controlled application of adhesive powder 61. The preferred adhesive powder 61 is a polyamide with particle size of between 200 and 500 microns manufactured by EMS-American Grilon located at 2066 Corporate Way, Sumter, S.C. 29151. Adhesive powder is applied in a range of one to six ounces per square yard.

The combination of the middle layer 40, first adhesive layer 43, and top layer 45 with adhesive powder 61 applied thereon is then transferred to a laminator that is generally indicated by numeral 90. Laminator 90 includes a lower belt, continuous conveyor that is generally indicated by numeral 70, which is in an opposing relationship to an upper belt, continuous conveyor that is generally indicated by numeral 77. Lower belt, continuous conveyor 70 includes a lower continuous belt 71 that encircles a first roller 72, second roller 73, third roller 74, fourth roller 75, and fifth roller 76. Upper belt, continuous conveyor 77 includes an upper continuous belt 78 that encircles a sixth roller 79, seventh roller 80, eighth roller 81, ninth roller 82, and tenth roller 83. Laminator 90 also includes a first dual, opposing, heating zone 85, a second dual, opposing, heating zone 86, and a dual, opposing, cooling zone 87. The combination of the middle layer 40, first adhesive layer 43, and top layer 45 with adhesive powder 61 applied to middle layer 40 first travels on the top of lower continuous belt 71 and the first roller 72 for a distance of approximately seven feet prior to being sandwiched between both lower continuous belt 71 and upper continuous belt 78. An infrared heater 65 is located above this portion of the lower belt, continuous conveyor 70.

The combination of the middle layer 40, first adhesive layer 43, and top layer 45 with adhesive powder 61 applied to middle layer 40 then passes under an infrared heater 65. Infrared heater 65 radiates heat in a temperature range of 200 to 1,600 degrees Fahrenheit. This melting of the adhesive 61 creates the previously described second adhesive layer 48.

There is a second let-off roll 64 having the previously described bottom layer 50 thereon that travels over a first guide roll 51 and underneath sixth roller 79. The bottom layer 50 then travels to in superposed relationship over the second adhesive layer 48 and into the dual and opposing lower belt, continuous conveyor 70 and upper belt, continuous conveyor 77 through a first dual, opposing, heating zone 85 that is at a temperature in the range of 250 to 450 degrees Fahrenheit. The combination of bottom layer 50, second adhesive layer 48, middle layer 40, first adhesive layer 43, and top layer 45, as arranged from top to bottom, then passes between seventh roller 80 on top and fifth roller 76 below, which applies pressure in the range of zero to twenty-six pounds per square inch. The combination of bottom layer 50, second adhesive layer 48, middle layer 40, first adhesive layer 43, and top layer 45 then passes through a second dual, opposing, heating zone 86 that is at a temperature in the range of 250 to 450 degrees Fahrenheit. The combination of bottom layer 50, second adhesive layer 48, middle layer 40, first adhesive layer 43, and top layer 45 then passes between eighth roller 81 on top and fourth roller 75 below, which applies pressure in the range of zero to twenty-six pounds per square inch. The combination of bottom layer 50, second adhesive layer 48, middle layer 40, first adhesive layer 43, and top layer 45 then passes through a dual, opposing, cooling zone 87 that is at a temperature in the range of 60 to 300 degrees Fahrenheit. The combination of bottom layer 50, second adhesive layer 48, middle layer 40, first adhesive layer 43, and top layer 45 then passes out of the upper belt, continuous conveyor 77 and ninth roller 82 and lower belt, continuous conveyor 70 and third roller 74. Lower continuous belt 71 then loops back around second roller 73, which places lower continuous belt 71 under constant pressure. Lower continuous belt 71 loops back around first roller 72 to complete the loop. In a similar manner, upper continuous belt 78 then loops back around tenth roller 83, which places upper continuous belt 78 under constant pressure. Upper continuous belt 78 loops back around sixth roller 79 to complete the loop.

The combination of lower belt, continuous conveyor 70 and upper belt, continuous conveyor 77 move the combination of bottom layer 50, second adhesive layer 48, middle layer 40, first adhesive layer 43, and top layer 45 at a rate of one to eleven yards per minute.

The combination of lower belt, continuous conveyor 70, upper belt, continuous conveyor 77, first dual, opposing, heating zone 85, second dual, opposing, heating zone 86, and dual, opposing, cooling zone 87 form a laminator as is generally indicated by numeral 90.

The combination of bottom layer 50, second adhesive layer 48, middle layer 40, first adhesive layer 43, and top layer 45 then passes over a second roller brush guide roll 34 and under a second slitter guide roll 38 and is then rolled onto take-up roll 98.

There is a third pass, as disclosed in FIG. 5, that is for the purpose of improving adhesion between layers to a minimum of ten pounds per inch. In addition, the loops of the bottom layer 50 are brushed and the selvage of the multi-layer material 10 is trimmed. It would be preferable to eliminate this pass if possible. The first let-off roll 55 has the combination of the top layer 45, first adhesive layer 43, middle layer 40, second adhesive layer 48, and bottom layer 50 thereon, in that order from top to bottom.

The combination of the top layer 45, first adhesive layer 43, middle layer 40, second adhesive layer 48, and bottom layer 50 then travels on top of a first continuous belt conveyor 56 at a speed in the range of one to eleven yards per minute.

While traveling on top of first continuous belt conveyor 56, the combination of the top layer 45, first adhesive layer 43, middle layer 40, second adhesive layer 48, and bottom layer 50 passes under an adhesive powder applicator 60, which does not disperse adhesive powder 61 on this third pass.

The combination of the top layer 45, first adhesive layer 43, middle layer 40, second adhesive layer 48, and bottom layer 50 is then transferred to the laminator 90 that includes the lower belt, continuous conveyor 70 and the upper belt, continuous conveyor 77 that are in an opposing relationship. Lower belt, continuous conveyor 70 includes a lower continuous belt 71 that encircles a first roller 72, second roller 73, third roller 74, fourth roller 75, and fifth roller 76. Upper belt, continuous conveyor 77 includes an upper continuous belt 78 that encircles a sixth roller 79, seventh roller 80, eighth roller 81, ninth roller 82, and tenth roller 83. Laminator 90 also includes a first dual, opposing, heating zone 85, a second dual, opposing, heating zone 86, and a dual, opposing, cooling zone 87. The combination of the top layer 45, first adhesive layer 43, middle layer 40, second adhesive layer 48, and bottom layer 50 first travels on the top of lower continuous belt 71 and the first roller 72 for a distance of approximately seven feet prior to being sandwiched between both lower continuous belt 71 and upper continuous belt 78. The infrared heater 65 located above this portion of the lower belt, continuous conveyor 70 is not heating on this third pass.

The combination of the top layer 45, first adhesive layer 43, middle layer 40, second adhesive layer 48, and bottom layer 50 then travels into the dual, opposing, lower belt, continuous conveyor 70 and upper belt, continuous conveyor 77 through a first dual, opposing heating zone 85 that is at a temperature in the range of 250 to 450 degrees Fahrenheit. The combination of top layer 45, first adhesive layer 43, middle layer 40, second adhesive layer 48, and bottom layer 50, as arranged from top to bottom, then passes between seventh roller 80 on top and fifth roller 76 below, which applies pressure in the range of zero to twenty-six pounds per square inch. The combination of top layer 45, first adhesive layer 43, middle layer 40, second adhesive layer 48, and bottom layer 50 then passes through a second dual, opposing, heating zone 86 that is at a temperature in the range of 250 to 450 degrees Fahrenheit. The combination of top layer 45, first adhesive layer 43, middle layer 40, second adhesive layer 48, and bottom layer 50 then passes between eighth roller 81 on top and fourth roller 75 below, which applies pressure in the range of zero to twenty-six pounds per square inch. The combination of top layer 45, first adhesive layer 43, middle layer 40, second adhesive layer 48, and bottom layer 50 then passes through a dual, opposing, cooling zone 87 that is at a temperature in the range of 60 to 300 degrees Fahrenheit. The combination of top layer 45, first adhesive layer 43, middle layer 40, second adhesive layer 48, and bottom layer 50 then passes out of the upper belt, continuous conveyor 77 and ninth roller 82 and lower belt, continuous conveyor 70 and third roller 74. Lower continuous belt 71 then loops back around second roller 73, which places lower continuous belt 71 under constant pressure. Lower continuous belt 71 loops back around first roller 72 to complete the loop. In a similar manner, upper continuous belt 78 then loops back around tenth roller 83, which places upper continuous belt 78 under constant pressure. Upper continuous belt 78 loops back around sixth roller 79 to complete the loop.

The combination of lower belt, continuous conveyor 70 and upper belt, continuous conveyor 77 move the combination of top layer 45, first adhesive layer 43, middle layer 40, second adhesive layer 48, and bottom layer 50 at a rate of one to eleven yards per minute.

The combination of lower belt, continuous conveyor 70, upper belt, continuous conveyor 77, first dual, opposing, heating zone 85, second dual, opposing, heating zone 86, and dual, opposing, cooling zone 87 form a laminator as is generally indicated by numeral 90.

The combination of top layer 45, first adhesive layer 43, middle layer 40, second adhesive layer 48, and bottom layer 50 then passes under a first roller brush guide roll 33 and a third roller brush guide roll 35 and over a loop brush 100. The loop brush 100 pushes the combination of top layer 45, first adhesive layer 43, middle layer 40, second adhesive layer 48, and bottom layer 50 against firs and third guide rolls 33 and 35, respectfully. The second guide roll 34 is ignored on this pass. The purpose of the loop brush 100 is to raise the loops of bottom layer 50 that have been matted down during the laminating process. A typical nonlimiting example of the material utilized in loop brush 100 is a flexible, rubber-backed brush suitable for wrapping on a roll denoted as 34AB with one inch wire bristles that is manufactured by Ashworth Brothers located at 1201 Laurens Road, Greenville, S.C.

The combination of the top layer 45, first adhesive layer 3, middle layer 40, second adhesive layer 48, and bottom layer 50 are then subjected to slitters 36 to create uniform product width and remove selvage. A nonlimiting example of slitters 36 are 301 D–18D that can be purchased from Textile and Industrial Sales, Inc., which is located at Dalton, Ga. 30720.

The combination of the top layer 45, first adhesive layer 43, middle layer 40, second adhesive layer 48, and bottom layer 50 travels over a first slitter guide roll 37, through slitters 36, under a third slitter guide roll 39 and then rolled onto take-up roll 98. The second slitter guide roll 38 is ignored on take-up roll 98. this third pass.

As an alternative embodiment, five layers 45, 143, 40, 148, and 50 are sent through the laminator 90 simultaneously, as shown in FIG. 6. In further detail, the top layer 45 is located on first let-off roll 93, the first adhesive layer 143 is located on a second let-off roll 94, the middle layer 40 is located on a third let-off roll 95, the second adhesive layer 148 is located on a fourth let-off roll 96, and the bottom layer 50 is located on fifth let-off roll 97. The first adhesive layer 143 and second adhesive layer 148 are preferably a polyamide adhesive web in the range of one to six ounces per square yard, however, any of wide variety of sheet adhesives will suffice such as polyamide adhesive webs or films, polyester adhesive webs or films, multi-polymer webs or films, and so forth. A typical nonlimiting example of a polyamide adhesive web is PA1001 manufactured by SPUNFAB® Adhesive Fabrics located at 1121 Tower Drive, Akron, Ohio 44305. The use of the same chemical in both the adhesive and the fabric provides for greater bond strength. Therefore, polyester adhesives work better with polyester fabrics and polyamide adhesives work better with nylon fabrics.

A urethane film may also be utilized in the range of four to twenty mil thickness. A typical nonlimiting example of a urethane sheet is a twelve mil PS8010 manufactured by Deerfield Urethane, Inc. located at South Deerfield, MA. 01373.

The combination of the top layer 45, first adhesive layer 143, middle layer 40, second adhesive layer 148, and bottom layer 50, in order from top to bottom, then travels through under a guide roll 25 and onto a laminator that is generally indicated by numeral 90. Laminator 90 includes a lower belt, continuous conveyor general indicated by numeral 70 and an upper belt, continuous conveyor 77 that are in an opposing relationship. Lower belt, continuous conveyor 70 includes a lower continuous belt 71 that encircles a first roller 72, second roller 73, third roller 74, fourth roller 75, and fifth roller 76. Upper belt, continuous conveyor 77 includes an upper continuous belt 78 that encircles a sixth roller 79, seventh roller 80, eighth roller 81, ninth roller 82, and tenth roller 83. Laminator 90 also includes a first dual, opposing, heating zone 85, second dual, opposing, heating zone 86, and a dual, opposing, cooling zone 87. The combination of the top layer 45, first adhesive layer 143, middle layer 40, second adhesive layer 148, and bottom layer 50, first travels on the top of lower continuous belt 71 and the first roller 72 for a distance of approximately seven feet prior to being sandwiched between both lower continuous belt 71 and upper continuous belt 78.

The combination of top layer 45, first adhesive layer 143, middle layer 40, second adhesive layer 148, and bottom layer 50 then travels into dual, opposing, lower belt, continuous conveyor 70 and upper belt, continuous conveyor 77 through a first dual, opposing, heating zone 85 that is at a temperature in the range of 250 to 450 degrees Fahrenheit. The combination of top layer 45, first adhesive layer 143, middle layer 40, second adhesive layer 148, and bottom layer 50 then passes between seventh roller 80 on top and fifth roller 76 below, which applies pressure in the range of zero to twenty-six pounds per square inch. The combination of top layer 45, first adhesive layer 143, middle layer 40, second adhesive layer 148, and bottom layer 50 then passes through a second dual, opposing, heating zone 86 that is at a temperature in the range of 250 to 450 degrees Fahrenheit. The combination of top layer 45, first adhesive layer 143, middle layer 40, second adhesive layer 148, and bottom layer 50 then passes between eighth roller 81 on top and fourth roller 75 below, which applies pressure in the range of zero to twenty-six pounds per square inch. The combination of top layer 45, first adhesive layer 143, middle layer 40, second adhesive layer 148, and bottom layer 50 then passes through a dual, opposing, cooling zone 87 that is at a temperature in the range of 60 to 300 degrees Fahrenheit. The combination of top layer 45, first adhesive layer 143, middle layer 40, second adhesive layer 148, and bottom layer 50 then passes out of the upper belt, continuous conveyor 77 and ninth roller 82 and lower belt, continuous conveyor 70 and third roller 74. Lower continuous belt 71 then loops back around second roller 73, which places lower continuous belt 71 under constant pressure. Lower continuous belt 71 loops back around first roller 72 to complete the loop. In a similar manner, upper continuous belt 78 then loops back around tenth roller 83, which places upper continuous belt 78 under constant pressure. Upper continuous belt 78 loops back around sixth roller 79 to complete the loop.

The combination of lower belt, continuous conveyor 70 and upper belt, continuous conveyor 77 move the combination of top layer 45, first adhesive layer 143, middle layer 40, second adhesive layer 148, and bottom layer 50 at a rate of one to eleven yards per minute.

The combination of lower belt, continuous conveyor 70, upper belt, continuous conveyor 77, first dual, opposing, heating zone 85, second dual, opposing, heating zone 86, and dual, opposing, cooling zone 87 form a laminator as is generally indicated by numeral 90. A nonlimiting example of a laminator 90 is a Meyer® Laminator RPS—K 2200, manufactured by Herbert Meyer GmbH, located at 8 Munchen 83, Bayerwaldstra Be 29, Germany.

The combination of top layer 45, first adhesive layer 143, middle layer 40, second adhesive layer 148, and bottom layer 50 then passes over a second roller brush guide roll 34 and under a second slitter guide roll 38 and is then rolled onto take-up roll 98.

Referring now to FIG. 7, which is the identical operation to that disclosed in FIG. 5, however, the first let-off roll 55 has the combination of the bottom layer 50, second adhesive layer 148, middle layer 40, first adhesive layer 143, and top layer 45 thereon. It would be preferable to completely process this material in one pass, however, without a custom built laminator, this is not possible. This second pass is for the purpose of improving adhesion between layers to a minimum of ten pounds per inch. In addition, the loops of the bottom layer 50 are brushed and the selvage of the multi-layer material 10 is trimmed. The combination of the top layer 45, first adhesive layer 143, middle layer 40, second adhesive layer 148, and bottom layer 50, in order from top to bottom, then travels on top of a first continuous belt conveyor 56 at a speed in the range of one to eleven yards per minute.

While traveling on top of first continuous belt conveyor 56, the combination of the top layer 45, first adhesive layer 143, middle layer 40, second adhesive layer 148, and bottom layer 50 is then transferred to the laminator 90 that includes the lower belt, continuous conveyor 70 and the upper belt, continuous conveyor 77 that are in an opposing relationship. Lower belt, continuous conveyor 70 includes a lower continuous belt 71 that encircles a first roller 72, second roller 73, third roller 74, fourth roller 75, and fifth roller 76. Upper belt, continuous conveyor 77 includes an upper continuous belt 78 that encircles a sixth roller 79, seventh roller 80, eighth roller 81, ninth roller 82, and tenth roller 83. Laminator 90 also includes a first dual, opposing, heating zone 85, a second dual, opposing, heating zone 86, and a dual, opposing, cooling zone 87. The combination of the top layer 45, first adhesive layer 143, middle layer 40, second adhesive layer 148, and bottom layer 50 first travels on the top of lower continuous belt 71 and the first roller 72 for a distance of approximately seven feet prior to being sandwiched between both lower continuous belt 71 and upper continuous belt 78.

The combination of the top layer 45, first adhesive layer 143, middle layer 40, second adhesive layer 148, and bottom layer 50 then travels into the dual, opposing, lower belt, continuous conveyor 70 and upper belt, continuous conveyor 77 through a first dual, opposing, heating zone 85 that is at a temperature in the range of 250 to 450 degrees Fahrenheit. The combination of top layer 45, first adhesive layer 143, middle layer 40, second adhesive layer 148, and bottom layer 50, as arranged from top to bottom, then passes between seventh roller 80 on top and fifth roller 76 below, which applies pressure in the range of zero to twenty-six pounds per square inch. The combination of top layer 45, first adhesive layer 143, middle layer 40, second adhesive layer 148, and bottom layer 50 then passes through a second dual, opposing, heating zone 86 that is at a temperature in the range of 250 to 450 degrees Fahrenheit. The combination of top layer 45, first adhesive layer 143, middle layer 40, second adhesive layer 148, and bottom layer 50 then passes between eighth roller 81 on top and fourth roller 75 below, which applies pressure in the range of zero to twenty-six pounds per square inch. The combination of top layer 45, first adhesive layer 143, middle layer 40, second adhesive layer 148, and bottom layer 50 then passes through a dual, opposing, cooling zone 87 that is at a temperature in the range of 60 to 300 degrees Fahrenheit. The combination of top layer 45, first adhesive layer 143, middle layer 40, second adhesive layer 148, and bottom layer 50 then passes out of the upper belt, continuous conveyor 77 and ninth roller 82 and lower belt, continuous conveyor 70 and third roller 74. Lower continuous belt 71 then loops back around second roller 73, which places lower continuous belt 71 under constant pressure. Lower continuous belt 71 loops back around first roller 72 to complete the loop. In a similar manner, upper continuous belt 78 then loops back around tenth roller 83, which places upper continuous belt 78 under constant pressure. Upper continuous belt 78 loops back around sixth roller 79 to complete the loop.

The combination of lower belt, continuous conveyor 70 and upper belt, continuous conveyor 77 move the combination of top layer 45, first adhesive layer 143, middle layer 40, second adhesive layer 148, and bottom layer 50 at a rate of one to eleven yards per minute.

The combination of lower belt, continuous conveyor 70, upper belt, continuous conveyor 77, first dual, opposing, heating zone 85, second dual, opposing, heating zone 86, and dual, opposing, cooling zone 87 form a laminator as is generally indicated by numeral 90.

The combination of top layer 45, first adhesive layer 143, middle layer 40, second adhesive layer 148, and bottom layer 50 then passes under a first roller brush guide roll 33 and a third roller brush guide roll 35 and over a loop brush 100. The loop brush 100 pushes the combination of top layer 45, first adhesive layer 143, middle layer 40, second adhesive layer 148, and bottom layer 50 against first and third guide rolls 33 and 35, respectfully. The purpose of the loop brush 100 is to raise the loops of bottom layer 50 that have been matted down during the laminating process. A typical nonlimiting example of the material utilized in loop brush 100 is a flexible, rubber backed brush suitable for wrapping on a roll denoted as 34AB with one inch wire bristles that is manufactured by Ashworth Brothers located at 1201 Laurens Road, Greenville, S.C.

The combination of the top layer 45, first adhesive layer 143, middle layer 40, second adhesive layer 148, and bottom layer 50 are then subjected to slitters 36 to create uniform product width and remove selvage. A nonlimiting example of slitters 36 are 301 D–18D that can be purchased from Textile and Industrial Sales, Inc., which is located at Dalton, Ga. 30720.

The combination of the top layer 45, first adhesive layer 143, middle layer 40, second adhesive layer 148, and bottom layer 50 travels over a first slitter guide roll 37, through slitters 36, under a third slitter guide roll 39 and then rolled onto take-up roll 98. The second slitter guide roll 38 is ignored on this third pass.

The combination of the bottom layer 50, second adhesive layer 148, middle layer 40, first adhesive layer 143, and top layer 45 is then rolled onto take-up roll 98 as the finished multi-layer material 10.

The reason the first embodiment is construed as the preferred embodiment is that the powder adhesive 61 is less expensive then the polyamide web or urethane film. In addition, the laminator 90 has a very difficult time in aligning five webs of material in superposed relationship without slowing down the speed of the conveyors 56, 70, and 77, considerably.

What is claimed:

1. A multi-layer material for covering ceramic armor attached to a military vehicle, which suppresses ceramic shrapnel during a ballistic event up to the magnitude of a 0.50 caliber at 2,000 to 2,200 feet per second at zero degree obliquity comprising a top layer of cover fabric that is adhesively attached to a middle layer of woven nylon fabric, having a weight in the range of fifteen to thirty-five ounces per square yard, that is adhesively attached to a bottom layer of loop pile, warp knit, weft-inserted fabric.

2. A multi-layer material for covering ceramic armor attached to a military vehicle, which suppresses ceramic shrapnel during a ballistic event up to the magnitude of a 0.50 caliber at 2,000 to 2,200 feet per second at zero degree obliquity comprising a top layer of woven polyester, cover fabric that is adhesively attached to a middle layer of woven nylon fabric, having a weight in the range of fifteen to thirty-five ounces per square yard, that is adhesively attached to a bottom layer of loop pile, warp knit, weft-inserted fabric with nylon loops and polyester base material.

3. A multi-layer material for covering ceramic armor attached to a military vehicle, which suppresses ceramic shrapnel during a ballistic event up to the magnitude of a 0.50 caliber at 2,000 to 2,200 feet per second at zero degree obliquity comprising a top layer of cover fabric that is adhesively attached to a middle layer of woven polyester fabric, having a weight in the range of fifteen to thirty-five ounces per square yard, that is adhesively attached to a bottom layer of loop pile, warp knit, weft-inserted fabric.

4. A multi-layer material for covering ceramic armor attached to a military vehicle, which suppresses ceramic shrapnel during a ballistic event up to the magnitude of a 0.50 caliber at 2,000 to 2,200 feet per second at zero degree obliquity comprising a top layer of woven polyester, cover fabric that is adhesively attached to a middle layer of woven polyester fabric, having a weight in the range of fifteen to thirty-five ounces per square yard, that is adhesively attached to a bottom layer of loop pile, warp knit, weft-inserted fabric with nylon loops and polyester base material.

* * * * *